United States Patent
Chen et al.

(10) Patent No.: US 8,665,968 B2
(45) Date of Patent: Mar. 4, 2014

(54) METHOD AND SYSTEM FOR 3D VIDEO CODING USING SVC SPATIAL SCALABILITY

(75) Inventors: Xuemin Chen, Rancho Santa Fe, CA (US); Wade Wan, Orange, CA (US); Brian Heng, Irvine, CA (US); Jason Herrick, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 611 days.

(21) Appl. No.: 12/840,568

(22) Filed: Jul. 21, 2010

(65) Prior Publication Data

US 2011/0074922 A1    Mar. 31, 2011

Related U.S. Application Data

(60) Provisional application No. 61/247,511, filed on Sep. 30, 2009, provisional application No. 61/360,797, filed on Jul. 1, 2010.

(51) Int. Cl.
*H04N 7/18*    (2006.01)

(52) U.S. Cl.
USPC ............................ 375/240.26; 348/43; 348/46

(58) Field of Classification Search
USPC ...................... 348/42–60; 375/240.01–240.29
See application file for complete search history.

(56) References Cited

U.S. PATENT DOCUMENTS

| | | | |
|---|---|---|---|
| 6,510,177 B1 * | 1/2003 | De Bonet et al. | 375/240.16 |
| 7,817,181 B2 * | 10/2010 | Lee | 348/43 |
| 7,956,930 B2 * | 6/2011 | Sullivan | 348/581 |
| 2009/0304081 A1 * | 12/2009 | Bourge | 375/240.15 |
| 2010/0165077 A1 * | 7/2010 | Yin et al. | 348/42 |
| 2010/0260268 A1 * | 10/2010 | Cowan et al. | 375/240.25 |
| 2011/0134214 A1 * | 6/2011 | Chen et al. | 348/43 |
| 2012/0092452 A1 * | 4/2012 | Tourapis et al. | 348/43 |
| 2012/0105583 A1 * | 5/2012 | Suh et al. | 348/43 |

* cited by examiner

*Primary Examiner* — Andy Rao
(74) *Attorney, Agent, or Firm* — Thomas|Horstemeyer, LLP

(57) ABSTRACT

Disclosed are various embodiments of three-dimensional (3D) video coding using scalable video coding (SVC) spatial scalability. In one embodiment, 3D video is encoded to generate a SVC base layer that includes a left first-resolution view and a right first-resolution view packed in a first frame. 3D video is encoded to generate a SVC enhancement layer that includes a left second-resolution view and a right second-resolution view packed in a second frame. The left second-resolution view and the right second-resolution view may have a higher spatial resolution than the left first-resolution view and the right first-resolution view.

20 Claims, 5 Drawing Sheets

METHOD AND SYSTEM FOR 3D VIDEO CODING USING SVC SPATIAL SCALABILITY

CROSS-REFERENCE TO RELATED APPLICATIONS/INCORPORATION BY REFERENCE

This patent application makes reference to, claims priority to, and claims benefit from U.S. Provisional Application Ser. No. 61/247,511, which was filed on Sep. 30, 2009.

This patent application makes reference to, claims priority to, and claims benefit from U.S. Provisional Application Ser. No. 61/360,797, which was filed on Jul. 1, 2010.

This application makes reference to:
U.S. patent application Ser. No. 12/840,557 filed on Jul. 21, 2010.

Each of the above stated applications is hereby incorporated herein by reference in its entirety.

FIELD OF THE INVENTION

Certain embodiments of the invention relate to video processing. More specifically, certain embodiments of the invention relate to a method and system for 3D video coding using SVC spatial scalability.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV (DTV), a 3D video is often desirable because it is often more realistic to viewers than the 2D counterpart. A 3D video comprises a left view video and a right view video. A 3D video frame may be produced by combining left view video components and right view video components.

Various video encoding standards, for example, MPEG-1, MPEG-2, MPEG-4, H.263, H.264/MPEG-4 advanced video coding (AVC), multi-view video coding (MVC) and scalable video coding (SVC), have been established for encoding digital video sequences in a compressed manner. For example, the MVC standard, which is an extension of the H.264/MPEG-4 AVC standard, may provide efficient coding of a 3D video. The SVC standard, which is also an extension of the H.264/MPEG-4 AVC standard, may enable transmission and decoding of partial bitstreams to provide video services with lower temporal or spatial resolutions or reduced fidelity, while retaining a reconstruction quality that is similar to that achieved using the H.264/MPEG-4 AVC. A modality of scalability in the SVC may comprise temporal scalability, spatial scalability, fidelity scalability and/or combined scalability. The temporal scalability provides a hierarchical prediction structure, while the spatial scalability provides an inter-layer prediction structure.

Most TV broadcasts, and similar multimedia feeds, utilize video formatting standard that enable communication of video images in the form of bitstreams. For example, a bitstream may be a transport stream (TS) which may comprise one or more elementary streams (ES). Packets in the same elementary stream all have the same packet identifier (PID). These video standards may utilize various interpolation and/or rate conversion functions to present content comprising still and/or moving images on display devices. For example, deinterlacing functions may be utilized to convert moving and/or still images to a format that is suitable for certain types of display devices that are unable to handle interlaced content. TV broadcasts, and similar video feeds, may be interlaced or progressive. Interlaced video comprises fields, each of which may be captured at a distinct time interval. A frame may comprise a pair of fields, for example, a top field and a bottom field. The pictures forming the video may comprise a plurality of ordered lines. During one of the time intervals, video content for the even-numbered lines may be captured. During a subsequent time interval, video content for the odd-numbered lines may be captured. The even-numbered lines may be collectively referred to as the top field, while the odd-numbered lines may be collectively referred to as the bottom field. Alternatively, the odd-numbered lines may be collectively referred to as the top field, while the even-numbered lines may be collectively referred to as the bottom field. In the case of progressive video frames, all the lines of the frame may be captured or played in sequence during one time interval. Interlaced video may comprise fields that were converted from progressive frames. For example, a progressive frame may be converted into two interlaced fields by organizing the even numbered lines into one field and the odd numbered lines into another field.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 3D video coding using SVC spatial scalability, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
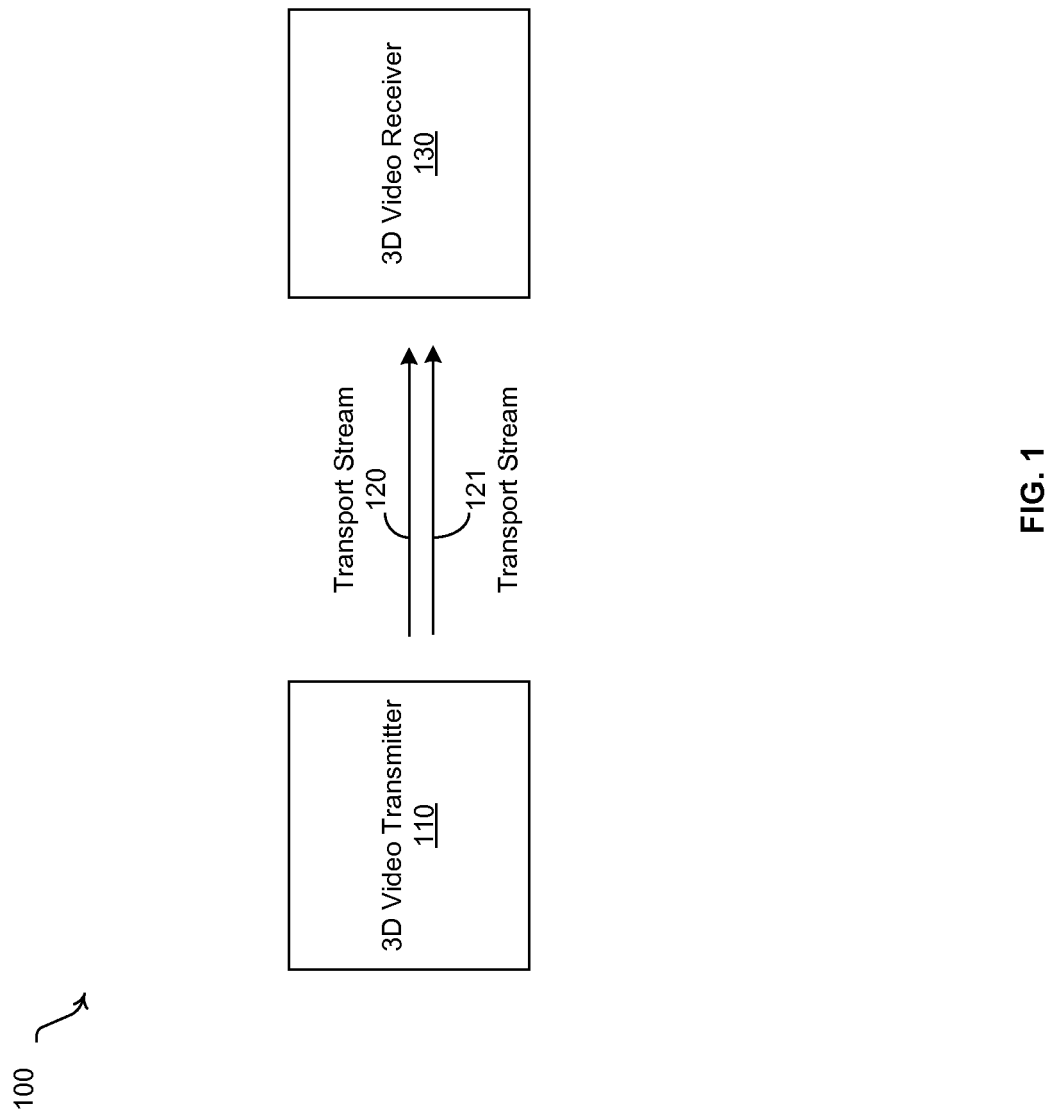
FIG. 1 is a block diagram illustrating an exemplary video communication system that is operable to provide 3D video coding using SVC spatial scalability, in accordance with an embodiment of the invention.

Certain embodiments of the invention can be found in a method and system for 3D video coding using SVC spatial scalability. In various embodiments of the invention, a 3-dimensional (3D) video transmitter may be operable to encode a 3D video to generate a scalable video coding (SVC) base layer and a SVC enhancement layer. A first view and a second view of the 3D video in the SVC enhancement layer may be packed in a same frame. The SVC base layer may comprise a first half-resolution view and a second half-resolution view of the 3D video. The first half-resolution view and the second half-resolution view may be packed in a first single frame. For example, the first half-resolution view and the second half-resolution view may be packed in a side-by-side (half) format or in a top-and-bottom (half) format. In this regard, for example, the first half-resolution view may be a left half-resolution view of the 3D video, and the second half-resolution view may be a right half-resolution view of the 3D video. The first view in the SVC enhancement layer may comprise a first high-resolution view and the second view in the SVC enhancement layer may comprise a second high-resolution view. The high-resolution may comprise a resolution that may be greater than half resolution. The first high-resolution view and the second high-resolution view may be packed in a second single frame. In this regard, for example, the first high-resolution view may be a left full-resolution view of the 3D video, and the second high-resolution view may be a right full-resolution view of the 3D video. The left full-resolution view and the right full-resolution view may be packed in a side-by-side (full) format or in a top-and-bottom (full) format. The first single frame, which may comprise the first half-resolution view and the second half-resolution view in the SVC base layer, may be a base-layer reference for the second single frame, which may comprise the first high-resolution view and the second high-resolution view in the SVC enhancement layer, for inter-layer prediction of spatial scalable coding.

In an exemplary embodiment of the invention, a total number of bits for the first half-resolution view may be different from a total number of bits for the second half-resolution view. A total number of bits for the first high-resolution view may be different from a total number of bits for the second high-resolution view.

When operating in film mode, the 3D video transmitter may be operable to encode the 3D video, using pulldown, to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. The 3D video transmitter may be operable to transmit the SVC base layer in the interlaced format at the higher frame rate and the SVC enhancement layer in the progressive format at the original frame rate to the 3D video receiver. In this instance, for example, the transmitted SVC base layer, which may comprise the first half-resolution view and the second half-resolution view, may be decoded, by the 3D video receiver, to generate a decompressed 3D video with the half-resolution in the interlaced format at the higher frame rate. The transmitted SVC enhancement layer, which may comprise the first high-resolution view and the second high-resolution view, may be decoded to generate a decompressed 3D video with the high-resolution in the progressive format at the original frame rate.

In an exemplary embodiment of the invention, the 3D video transmitter may be operable to transmit the SVC base layer and the SVC enhancement layer in a single elementary stream in a transport stream to a 3D video receiver. Alternatively, the SVC base layer may be transmitted in a first elementary stream in a transport stream and the SVC enhancement layer may be transmitted in a second elementary stream in the transport stream to a 3D video receiver. In another exemplary embodiment of the invention, the SVC base layer may be transmitted in a first transport stream to a 3D video receiver and SVC enhancement layer may be transmitted in a second transport stream to the 3D video receiver.

FIG. 1 is a block diagram illustrating an exemplary video communication system that is operable to provide 3D video coding using SVC spatial scalability, in accordance with an embodiment of the invention. Referring to FIG. 1, there is shown a video communication system 100. The video communication system 100 may comprise a 3D video transmitter 110, a transport stream 120, a transport stream 121 and a 3D video receiver 130.

The 3D video transmitter 110 may comprise suitable logic, circuitry, interfaces and/or code that may be operable to distribute encoded or compressed 3D video content to the 3D video receiver 130 via a bitstream such as the transport stream 120. The 3D video transmitter 110 such as, for example, a headend system may be operable to provide various services such as, for example, distribution, multicast, and/or quality of service necessary for a reliable and timely transmission of the compressed 3D video content to the 3D video receiver 130. The 3D video transmitter 110 may utilize, for example, a cable TV network, a satellite broadcasting network, the Internet protocol (IP) data network such as the Internet, and/or a wireless communication network for delivery of services or the compressed 3D video content to the 3D video receiver 130. The 3D video may be encoded or compressed using a SVC method with spatial scalability, and the compressed 3D video may be transmitted to the 3D video receiver 130 via one or more bitstreams such as the transport streams 120, 121, for example.

The 3D video receiver 130 may comprise suitable logic, circuitry, interfaces and/or code that may be operable to receive the compressed 3D video via one or more bitstreams such as the transport streams 120, 121 from the 3D video transmitter 110. The 3D video receiver 130 such as, for example, a set-top box (STB) may be operable to decode or decompress the received compressed 3D video to generate a decompressed 3D video using, for example, a SVC method with spatial scalability.

In operation, the 3D video transmitter 110 may be operable to encode a 3D video to generate a SVC base layer and a SVC enhancement layer. A first view and a second view of the 3D video in the SVC enhancement layer may be packed in a same frame. The SVC base layer may comprise a first half-resolution view and a second half-resolution view of the 3D video. The first half-resolution view and the second half-resolution view may be packed in a first single frame. For example, the first half-resolution view and the second half-resolution view may be packed in a side-by-side (half) format or in a top-and-bottom (half) format. In an exemplary embodiment of the invention, the first half-resolution view may be a left half-resolution view of the 3D video, and the second half-resolution view may be a right half-resolution view of the 3D video. In another exemplary embodiment of the invention, the first half-resolution view may be a right half-resolution view of the 3D video, and the second half-resolution view may be a left half-resolution view of the 3D video. The first view in the SVC enhancement layer may comprise a first high-resolution view and the second view in the SVC enhancement layer may comprise a second high-resolution view. The high-resolution may comprise a resolution that may be greater than half resolution. The first high-resolution view and the second high-resolution view may be packed in a second single frame. In an exemplary embodiment of the invention, the first high-resolution view may be a left full-resolution view of the 3D video, and the second high-resolution view may be a right full-resolution view of the 3D video. In another exemplary embodiment of the invention, the first high-resolution view may be a right full-resolution view of the 3D video, and the second high-resolution view may be a left full-resolution view of the 3D video. In this regard, for example, the left full-resolution view and the right full-resolution view may be packed in a side-by-side (full) format or in a top-and-bottom (full) format.

The first single frame, which may comprise the first half-resolution view and the second half-resolution view in the SVC base layer, may be a base-layer reference for the second single frame, which may comprise the first high-resolution view and the second high-resolution view in the SVC enhancement layer, for inter-layer prediction of spatial scalable coding.

A 3D video in the side-by-side (half) format may comprise, for example, a half resolution first view such as the left view and a half resolution second view such as the right view, which may be packed in a side-by-side format or left-and-right format in a frame. A 3D video in the top-and-bottom (half) format may comprise, for example, a half resolution first view such as the left view and a half resolution second view such as the right view, which may be packed in a top-and-bottom format in a frame. A 3D video in the side-by-side (full) format may comprise, for example, a full resolution first view such as the left view and a full resolution second view such as the right view, which may be packed in a side-by-side format or left-and-right format in a frame with twice the normal bandwidth. A 3D video in the top-and-bottom (full) format may comprise, for example, a full resolution first view such as the left view and a full resolution second view such as the right view, which may be packed in a top-and-bottom format in a frame with twice the normal bandwidth. The top-and-bottom (full) format may also be known as a frame packing format.

In an exemplary embodiment of the invention, a total number of bits for the first half-resolution view may be different from a total number of bits for the second half-resolution view. A total number of bits for the first high-resolution view may be different from a total number of bits for the second high-resolution view.

When operating in film mode, the 3D video transmitter 110 may be operable to encode the 3D video, using pulldown, to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. The 3D video transmitter 110 may be operable to transmit the SVC base layer in the interlaced format at the higher frame rate and the SVC enhancement layer in the progressive format at the original frame rate to the 3D video receiver 130. In this instance, for example, the transmitted SVC base layer, which may comprise the first half-resolution view and the second half-resolution view, may be decoded, by the 3D video receiver 130, to generate a decompressed 3D video with the half-resolution in the interlaced format at the higher frame rate. The transmitted SVC enhancement layer, which may comprise the first high-resolution view and the second high-resolution view, may be decoded to generate a decompressed 3D video with the high-resolution in the progressive format at the original frame rate. In this regard, for example, when operating in film mode, a 3D video in 1080p24 film format at 24 Hz frame rate may be encoded by the 3D video transmitter 110 to generate a SVC base layer in side-by-side (half) 1080i60 interlaced format at 30 Hz frame rate using 3:2 pulldown. In the mean time, the 3D video may be encoded to generate a SVC enhancement layer in side-by-side (full) 1080p24 format at 24 Hz frame rate. Accordingly, the transmitted SVC base layer which may be in the side-by-side (half) 1080i60 format may be decoded by the 3D video receiver 130 to generate a decompressed 3D video in the side-by-side (half) 1080i60 format. The transmitted SVC enhancement layer which may be in the side-by-side (full) 1080p24 format may be decoded to generate a decompressed 3D video in frame packing 1080p24 format, for example.

The pulldown is a telecine process which may convert a film frame or a video frame at frame rate to an interlaced video frame at different frame rate. The pulldown may comprise 3:2 pulldown or 2:2 pulldown. For example, a 3D video frame in a 1080p24 format at 24 Hz frame rate may be converted to a 3D video frame in a 1080i60 interlaced format at 30 Hz frame rate (60 Hz field rate) by performing a 3:2 pulldown. A 3D video frame in a 1080p24 format at 24 Hz frame rate may be converted to a 3D video frame in a 1080i50 format at 25 Hz frame rate (50 Hz field rate) by performing a 2:2 pulldown.

In an exemplary embodiment of the invention, the 3D video transmitter 110 may be operable to transmit the SVC base layer and the SVC enhancement layer in a single elementary stream in a transport stream such as the transport stream 120 to a 3D video receiver such as the 3D video receiver 130. Alternatively, the SVC base layer may be transmitted in a first elementary stream in the transport stream 120 and the SVC enhancement layer may be transmitted in a second elementary stream in the transport stream 120 to the 3D video receiver 130. In another exemplary embodiment of the invention, the SVC base layer may be transmitted in a first transport stream such as the transport stream 120 and the SVC enhancement layer may be transmitted in a second transport stream such as the transport stream 121 to the 3D video receiver 130.

In an exemplary embodiment of the invention, the SVC base layer stream may be backward compatible with existing advanced video coding (AVC) systems. In this regard, the 3D video receiver 130 may be operable to decode the SVC base layer stream using the AVC method, while the SVC enhancement layer stream may be decoded using the SVC method with spatial scalability. Accordingly, a 3D video with high resolution such as a full resolution 3D video may be provided using the SVC spatial scalability. The SVC base layer may provide a half-resolution 3D video which may be compatible with legacy systems such as AVC systems.

Figure 2:
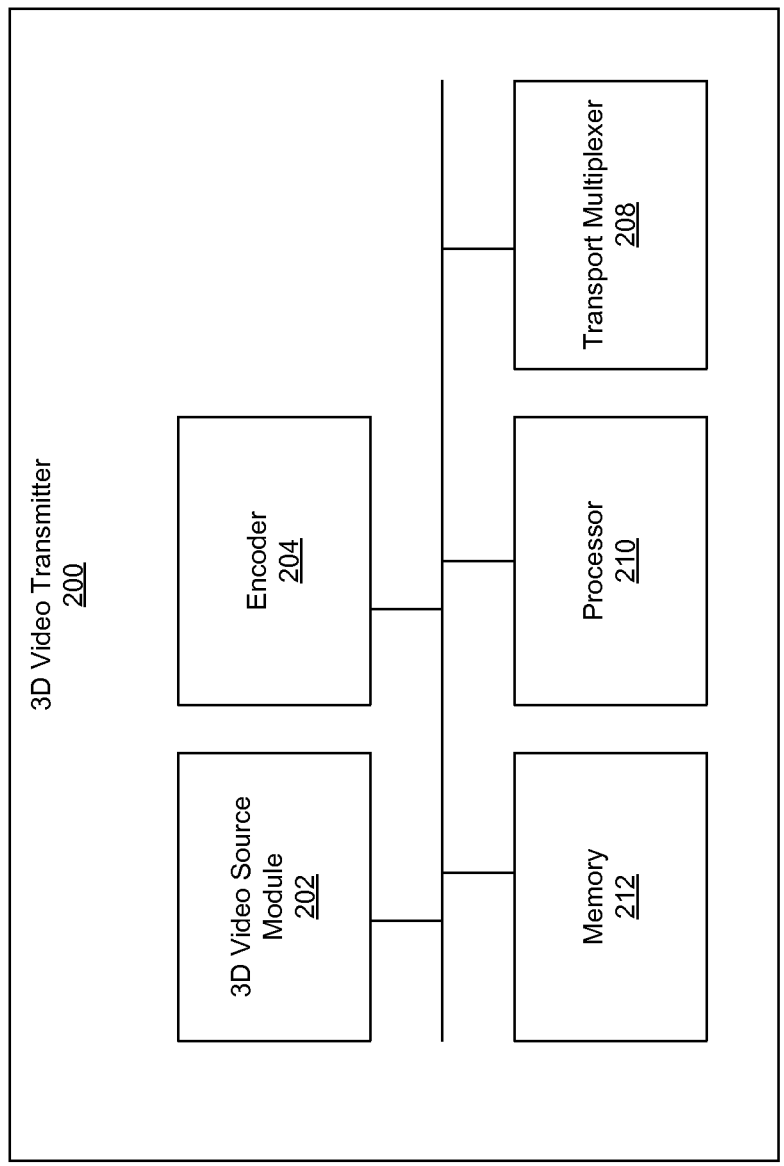
FIG. 2 is a block diagram illustrating an exemplary 3D video transmitter that is operable to provide 3D video coding using SVC spatial scalability, in accordance with an embodiment of the invention.

FIG. 2 is a block diagram illustrating an exemplary 3D video transmitter that is operable to provide 3D video coding using SVC spatial scalability, in accordance with an embodiment of the invention. Referring to FIG. 2, there is shown a 3D video transmitter 200. The 3D video transmitter 200 may comprise a 3D video source module 202, an encoder 204, a transport multiplexer 208, a processor 210 and a memory 212.

The 3D video source module 202 may comprise suitable logic, circuitry, interfaces and/or code that may be operable to capture and/or generate source 3D video content. The 3d video source module 202 may be operable, for example, to generate stereoscopic 3D video comprising such as left view and right view video data from the captured source 3D video content. The left view video and the right view video may be communicated to the encoder 204 for video encoding or compressing.

The encoder 204 may comprise suitable logic, circuitry, interfaces and/or code that may be operable to receive 3D video content from the 3D video source module 202 for video encoding. In an exemplary embodiment of the invention, the encoder 204 may be operable to encode a 3D video to generate a SVC base layer and a SVC enhancement layer. A first view and a second view of the 3D video in the SVC enhancement layer may be packed in a same frame. The SVC base layer may comprise a first half-resolution view and a second half-resolution view of the 3D video. The first half-resolution view and the second half-resolution view may be packed in a first single frame. For example, the first half-resolution view and the second half-resolution view may be packed in a side-by-side (half) format or in a top-and-bottom (half) format. In this regard, for example, the first half-resolution view may be a left half-resolution view of the 3D video, and the second half-resolution view may be a right half-resolution view of the 3D video. The first view in the SVC enhancement layer may comprise a first high-resolution view and the second view in the SVC enhancement may comprise a second high-resolution view. The high-resolution may comprise a resolution that may be greater than half resolution. The first high-resolution view and the second high-resolution view may be packed in a second single frame. In this regard, for example, the first high-resolution view may be a left full-resolution view of the 3D video, and the second high-resolution view may be a right full-resolution view of the 3D video. The left full-resolution view and the right full-resolution view may be packed in a side-by-side (full) format or in a top-and-bottom (full) format.

The first single frame, which may comprise the first half-resolution view and the second half-resolution view in the SVC base layer, may be a base-layer reference for the second single frame, which may comprise the first high-resolution view and the second high-resolution view in the SVC enhancement layer, for inter-layer prediction of spatial scalable coding.

A total number of bits for the first half-resolution view may be different from a total number of bits for the second half-resolution view. A total number of bits for the first high-resolution view may be different from a total number of bits for the second high-resolution view.

When operating in film mode, the encoder 204 may be operable to encode the 3D video, using pulldown, to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in the progressive format at the original frame rate. In this regard, for example, when operating in film mode, a 3D video in 1080p24 film format at 24 Hz frame rate may be encoded by the encoder 204 to generate a SVC base layer in side-by-side (half) 1080i60 interlaced format at 30 Hz frame rate using 3:2 pulldown. In the mean time, the 3D video may be encoded to generate a SVC enhancement layer in side-by-side (full) 1080p24 format at 24 Hz frame rate.

The SVC base layer and the SVC enhancement layer may be generated by the encoder 204 as a single elementary stream in a transport stream such as the transport stream 120 for transmission to a 3D video receiver such as the 3D video receiver 130. Alternatively, the SVC base layer may be in a first elementary stream and SVC enhancement layer may be in a second elementary stream in the transport stream 120 for transmission to the 3D video receiver 130. In another embodiment of the invention, the SVC base layer may be generated by the encoder 204 as an elementary stream in a first transport stream such as the transport stream 120 and the SVC enhancement layer may be generated as an elementary stream in a second transport stream such as the transport stream 121 for transmission to the 3D video receiver 130.

In an exemplary embodiment of the invention, the SVC base layer stream may be backward compatible with existing systems such as AVC systems.

The transport multiplexer 208 may comprise suitable logic, circuitry, interfaces and/or code that may be operable to merge a plurality of encoded or compressed video sequences or streams generated by the encoder 204 into one or more combined video streams or bitstreams for transmission to a 3D video receiver such as the 3D video receiver 130.

The processor 210 may comprise suitable logic, circuitry, interfaces and/or code that may be operable to communicate with the 3D video source module 202, the encoder 204 and the transport multiplexer 208 to perform various functions of the 3D video transmitter 200 such as the SVC encoding function.

The memory 212 may comprise suitable logic, circuitry, interfaces and/or code that may be operable to store information such as executable instructions and data that may be utilized by the processor 210, the 3D video source module 202, the encoder 204 and/or the transport multiplexer 208 to perform various functions of the 3D video transmitter 200.

In operation, the encoder 204 may be operable to receive 3D video content from the 3D video source module 202 for video encoding. The encoder 204 may be operable to encode a 3D video to generate a SVC base layer and a SVC enhancement layer. A first view and a second view of the 3D video in the SVC enhancement layer may be packed in a same frame. The SVC base layer may comprise a first half-resolution view and a second half-resolution view of the 3D video. The first half-resolution view and the second half-resolution view may be packed in a first single frame. For example, the first half-resolution view and the second half-resolution view may be packed in a side-by-side (half) format or in a top-and-bottom (half) format. In this regard, for example, the first half-resolution view may be a left half-resolution view of the 3D video, and the second half-resolution view may be a right half-resolution view of the 3D video. The first view in the SVC enhancement layer may comprise a first high-resolution view and the second view in the SVC enhancement layer may comprise a second high-resolution view. The high-resolution may comprise a resolution that may be greater than half resolution. The first high-resolution view and the second high-resolution view may be packed in a second single frame. In this regard, for example, the first high-resolution view may be a left full-resolution view of the 3D video, and the second high-resolution view may be a right full-resolution view of the 3D video. The left full-resolution view and the right full-resolution view may be packed in a side-by-side (full) format or in a top-and-bottom (full) format.

The first single frame, which may comprise the first half-resolution view and the second half-resolution view in the SVC base layer, may be a base-layer reference for the second single frame, which may comprise the first high-resolution view and the second high-resolution view in the SVC enhancement layer, for inter-layer prediction of spatial scalable coding.

A total number of bits for the first half-resolution view may be different from a total number of bits for the second half-resolution view. A total number of bits for the first high-resolution view may be different from a total number of bits for the second high-resolution view.

When operating in film mode, the encoder 204 may be operable to encode the 3D video, using pulldown, to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which may comprise the first high-resolution view and the second high-resolution view, in a progressive format at the original frame rate. In this instance, for example, the transmitted SVC base layer, which may comprise the first half-resolution view and the second half-resolution view, may be decoded, by the 3D video receiver 130, to generate a decompressed 3D video with the half-resolution in the interlaced format having the higher frame rate. The transmitted SVC enhancement layer, which may comprise the first high-resolution view and the second high-resolution view, may be decoded to generate a decompressed 3D video with the high-resolution in the progressive format having the original frame rate. In this regard, for example, when operating in film mode, a 3D video in 1080p24 film format at 24 Hz frame rate may be encoded by the encoder 204 to generate a SVC base layer in side-by-side (half) 1080i60 interlaced format at 30 Hz frame rate using 3:2 pulldown. In the mean time, the 3D video may be encoded to generate a SVC enhancement layer in side-by-side (full) 1080p24 format at 24 Hz frame rate. Accordingly, the transmitted SVC base layer which may be in the side-by-side (half) 1080i60 format may be decoded by the 3D video receiver 130 to generate a decompressed 3D video in the side-by-side (half) 1080i60 format. The transmitted SVC enhancement layer which may be in the side-by-side (full) 1080p24 format may be decoded to generate a decompressed 3D video in a frame packing 1080p24 format, for example.

The SVC base layer and the SVC enhancement layer may be generated by the encoder 204 as a single elementary stream in a transport stream such as the transport stream 120 for transmission to a 3D video receiver such as the 3D video receiver 130. Alternatively, the SVC base layer may be in a first elementary stream and SVC enhancement layer may be in a second elementary stream in the transport stream 120 for transmission to the 3D video receiver 130. In another embodiment of the invention, the SVC base layer may be generated by the encoder 204 as an elementary stream in a first transport stream such as the transport stream 120 and the SVC enhancement layer may be generated as an elementary stream in a second transport stream such as the transport stream 121 for transmission to the 3D video receiver 130.

In an exemplary embodiment of the invention, the SVC base layer stream may be backward compatible with existing AVC systems. In this regard, the 3D video receiver 130 may be operable to decode the SVC base layer stream using the AVC method, while the SVC enhancement layer stream may be decoded using the SVC method with spatial scalability. Accordingly, a 3D video with high resolution such as a full resolution 3D video may be provided using the SVC spatial scalability. The SVC base layer may provide a half-resolution 3D video which may be compatible with legacy systems such as AVC systems.

Figure 3:
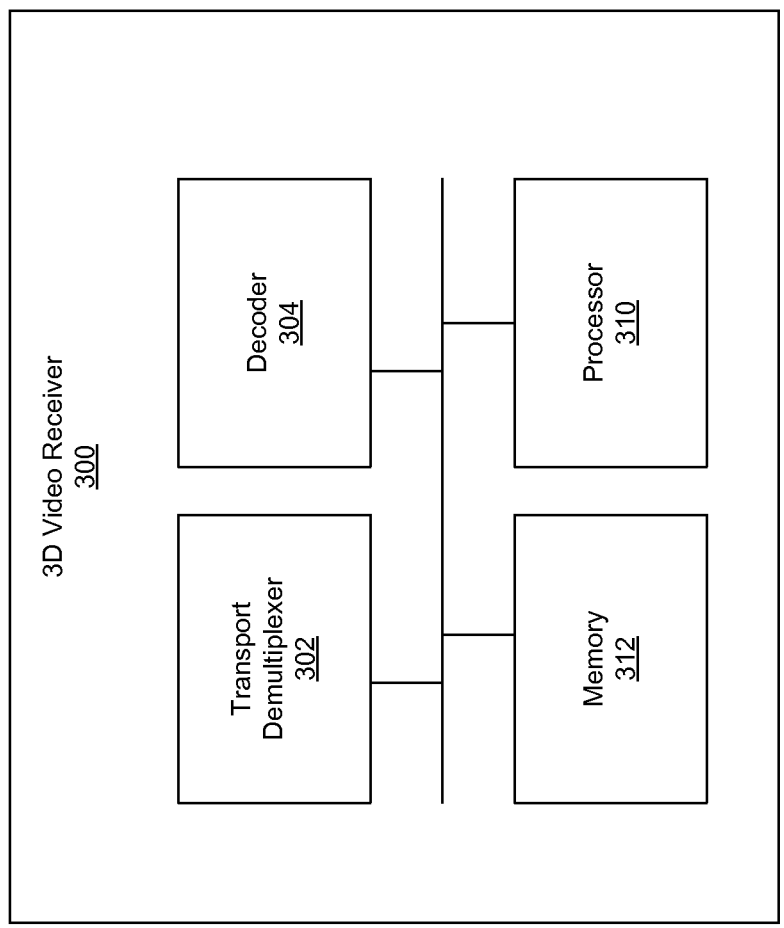
FIG. 3 is a block diagram illustrating an exemplary 3D video receiver that is operable to provide 3D video coding using SVC spatial scalability, in accordance with an embodiment of the invention.

FIG. 3 is a block diagram illustrating an exemplary 3D video receiver that is operable to provide 3D video coding using SVC spatial scalability, in accordance with an embodiment of the invention. Referring to FIG. 3, there is shown a 3D video receiver 300. The 3D video receiver 300 may comprise a transport demultiplexer 302, a decoder 304, a processor 310 and a memory 312.

The transport demultiplexer 302 may comprise suitable logic, circuitry, interfaces and/or code that may be operable to receive 3D video streams such as the transport streams 120, 121 from a 3D video transmitter such as the 3D video transmitter 110. The received 3D video streams may comprise the SVC base layer and/or the SVC enhancement layer. The transport demultiplexer 302 may be operable to demultiplex and/or parse the received 3D video streams for processing by the decoder 304.

The decoder 304 may comprise suitable logic, circuitry, interfaces and/or code that may be operable to decode or decompressed encoded 3D video which may be received form the transport demultiplexer 302. In an exemplary embodiment of the invention, the decoder 304 may be operable to decode the SVC base layer and/or the SVC enhancement layer. The SVC base layer may comprise, for example, a first half-resolution view and a second half-resolution view which may be packed in a first single frame. The SVC enhancement layer may comprise, for example, a first high-resolution view and a second high-resolution view which may be packed in a second single frame. In this regard, the first single frame in the SVC base layer may be used, for example, as a base-layer reference for the second single frame in the SVC enhancement layer.

When operating in film mode, the 3D video transmitter 110 may encode the 3D video, using pulldown, to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which comprises the first high-resolution view and the second high-resolution view, in a progressive format at the original frame rate. In this instance, for example, the decoder 304 may be operable to decode the received SVC base layer to generate a decompressed 3D video with the half-resolution in the interlaced format at the higher frame rate. The received SVC enhancement layer may be decoded to generate a decompressed 3D video with the high-resolution in the progressive format at the original frame rate. In this regard, for example, when operating in film mode, a 3D video in 1080p24 film format at 24 Hz frame rate may be encoded by the 3D video transmitter 110 to generate a SVC base layer in side-by-side (half) 1080i60 interlaced format at 30 Hz frame rate using 3:2 pulldown. In the mean time, the 3D video may be encoded to generate a SVC enhancement layer in side-by-side (full) 1080p24 format at 24 Hz frame rate. Accordingly, the decoder 304 may be operable to decode the received SVC base layer which may be in the side-by-side (half) 1080i60 format to generate a decompressed 3D video in the side-by-side (half) 1080i60 format. The received SVC enhancement layer which may be in the side-by-side (full) 1080p24 format may be decoded to generate a decompressed 3D video in frame packing 1080p24 format, for example.

In an exemplary embodiment of the invention, the SVC base layer stream may be backward compatible with existing AVC systems. In this regard, the decoder 304 may be operable to decode the SVC base layer using the AVC method, while the SVC enhancement layer may be decoded using the SVC method with spatial scalability. Accordingly, a 3D video with high resolution such as a full resolution 3D video may be provided using the SVC spatial scalability. The SVC base layer may provide a half-resolution 3D video which may be compatible with legacy systems such as AVC systems.

The processor 310 may comprise suitable logic, circuitry, interfaces and/or code that may be operable to communicate with the transport demultiplexer 302 and the decoder 304 to perform various functions of the 3D video receiver 300 such as the SVC decoding function.

The memory 312 may comprise suitable logic, circuitry, interfaces and/or code that may be operable to store information such as executable instructions and data that may be utilized by the processor 310, the transport demultiplexer 302 and/or the decoder 304 to perform various functions of the 3D video receiver 300.

In operation, the decoder 304 may be operable to decode the received SVC base layer and/or the SVC enhancement layer. The SVC base layer may comprise, for example, a first half-resolution view and a second half-resolution view which may be packed in a first single frame. The SVC enhancement layer may comprise, for example, a first high-resolution view and a second high-resolution view which may be packed in a second single frame. In this regard, the first single frame in the SVC base layer may be used, for example, as a base-layer reference for the second single frame in the SVC enhancement layer.

When operating in film mode, the 3D video transmitter 110 may encode the 3D video, using pulldown, to generate the SVC base layer. The SVC base layer may comprise the first half-resolution view and the second half-resolution view, in an interlaced format at a higher frame rate that is higher than original frame rate of the 3D video. The 3D video may be encoded to generate the SVC enhancement layer, which comprises the first high-resolution view and the second high-resolution view, in a progressive format at the original frame rate. In this instance, for example, the decoder 304 may be operable to decode the received SVC base layer to generate a decompressed 3D video with the half-resolution in the interlaced format at the higher frame rate. The received SVC enhancement layer may be decoded to generate a decompressed 3D video with the high-resolution in the progressive format at the original frame rate. In this regard, for example, when operating in film mode, a 3D video in 1080p24 film format at 24 Hz frame rate may be encoded by the 3D video transmitter 110 to generate a SVC base layer in side-by-side (half) 1080i60 interlaced format at 30 Hz frame rate using 3:2 pulldown. In the mean time, the 3D video may be encoded to generate a SVC enhancement layer in side-by-side (full) 1080p24 format at 24 Hz frame rate. Accordingly, the decoder 304 may be operable to decode the received SVC base layer which may be in the side-by-side (half) 1080i60 format to generate a decompressed 3D video in the side-by-side (half) 1080i60 format. The received SVC enhancement layer which may be in the side-by-side (full) 1080p24 format may be decoded to generate a decompressed 3D video having a frame packing 1080p24 format, for example.

In an exemplary embodiment of the invention, the SVC base layer stream may be backward compatible with existing AVC systems. In this regard, the decoder 304 may be operable to decode the SVC base layer using the AVC method, while the SVC enhancement layer may be decoded using the SVC method with spatial scalability. Accordingly, a 3D video with high resolution such as a full resolution 3D video may be provided using the SVC spatial scalability. The SVC base layer may provide a half-resolution 3D video which may be compatible with legacy systems such as AVC systems.

Figure 4:
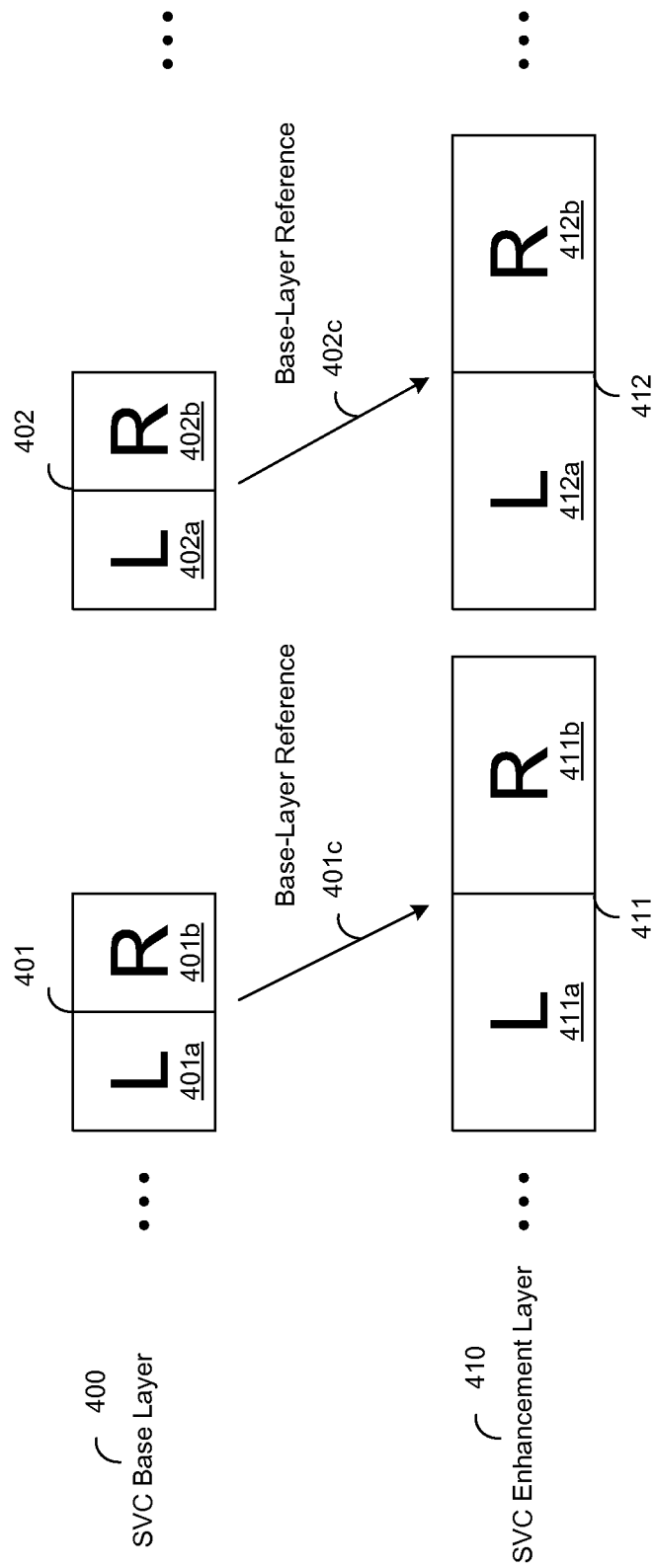
FIG. 4 is a block diagram illustrating an exemplary prediction of SVC spatial scalability, in accordance with an embodiment of the invention.

FIG. 4 is a block diagram illustrating an exemplary prediction of SVC spatial scalability, in accordance with an embodiment of the invention. Referring to FIG. 4, there is shown a SVC base layer 400 and a SVC enhancement layer 410. The SVC base layer 400 may comprise a left half-resolution view and a right half-resolution view packed in a single frame such as the frame 401 or the frame 402 in a side-by-side (half) format as illustrated by the left half-resolution view 401a, the right half-resolution view 401b, the left half-resolution view 402a and the right half-resolution view 402b. The SVC enhancement layer 410 may comprise a left high-resolution view and a right high-resolution view packed in a single frame such as the frame 411 or the frame 412 in a side-by-side (full) format as illustrated by the left high-resolution view 411a, the right high-resolution view 411b, the left high-resolution view 412a and the right high-resolution view 412b. In this regard, the SVC enhancement layer may be processed at a frame rate which matches the frame rate of the SVC base layer, for example.

In an exemplary embodiment of the invention, the frame 401 in the SVC base layer 400 may be used as a base-layer reference 401c for the frame 411 in the SVC enhancement layer 410 for inter-layer prediction of spatial scalable coding. The frame 402 in the SVC base layer 400 may be used as a base-layer reference 402c for the frame 412 in the SVC enhancement layer 410 for inter-layer prediction of spatial scalable coding.

In the exemplary embodiment of the invention illustrated in FIG. 4, the left half-resolution views 401a, 402a and the right half-resolution views 401b, 402b in side-by-side (half) format are shown, and the left high-resolution views 411a, 412a and the right high-resolution views 411b, 412b in side-by-side (full) format are shown. Notwithstanding, the invention is not so limited. A left half-resolution view and a right half-resolution view in the SVC base layer 400 may be packed in a top-and-bottom (half) format, for example. A left high-resolution view and a right high-resolution view in the SVC enhancement layer 410 may be packed in a top-and-bottom (full) format, for example.

Instead of full resolution, a left high-resolution view and a right high-resolution view in the SVC enhancement layer 410, both with a resolution which is greater than half resolution and different from full resolution, may be illustrated. For example, a frame in the SVC base layer 400 such as the frame 401 in a 1080p24 format may comprise a resolution of 1920×1080 pixels. The left half-resolution view 401a and the right half-resolution view 401b may both comprise a resolution of 960×1080 pixels. In instances when the frame 411 in the SVC enhancement layer 410 may comprise a resolution of 3840×1080 pixels, the left high-resolution view 411a and the right high-resolution view 411b may both comprise a full resolution of 1920×1080 pixels. In instances when the frame 411 in the SVC enhancement layer 410 may comprise a resolution of 2880×1080 pixels, the left high-resolution view 411a and the right high-resolution view 411b may both comprise a resolution of 1440×1080 pixels. In instances when the frame 411 in the SVC enhancement layer 410 may comprise a resolution of 4096×1080 pixels, the left high-resolution view 411a and the right high-resolution view 411b may both comprise a resolution of 2048×1080 pixels. In instances when the frame 411 in the SVC enhancement layer 410 may comprise a resolution of 4096×1440 pixels, the left high-resolution view 411a and the right high-resolution view 411b may both comprise a resolution of 2048×1440 pixels.

Figure 5:
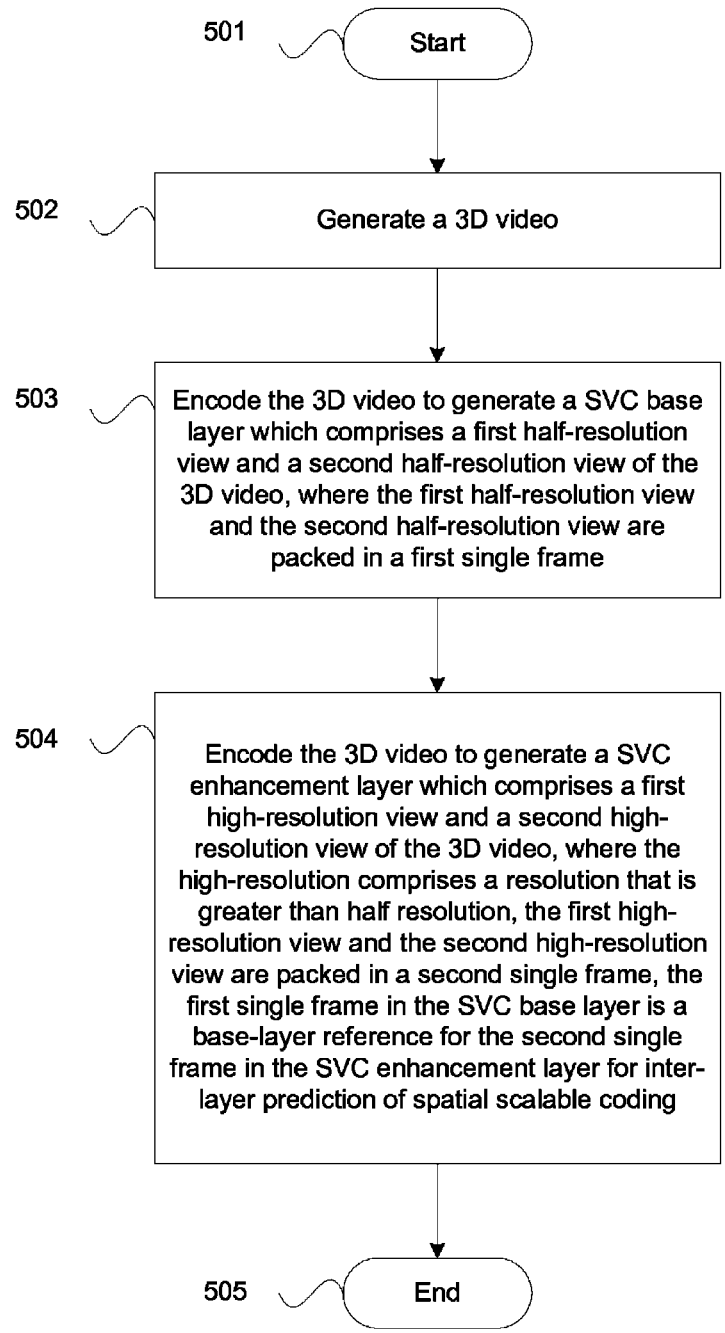
FIG. 5 is a flow chart illustrating exemplary steps for 3D video coding using SVC spatial scalability, in accordance with an embodiment of the invention.

FIG. 5 is a flow chart illustrating exemplary steps for 3D video coding using SVC spatial scalability, in accordance with an embodiment of the invention. Referring to FIG. 5, the exemplary steps start at step 501. In step 502, the 3D video source module 202 in the 3D video transmitter 200 may be operable to generate a 3D video. In step 503, the encoder 204 in the 3D video transmitter 200 may be operable to encode the 3D video to generate a SVC base layer 400 which may comprise a first half-resolution view 401a and a second half-resolution view 401b of the 3D video. The first half-resolution view 401a and the second half-resolution view 401b may be packed in a first single frame 401. In step 504, the encoder 204 may be operable to encode the 3D video to generate a SVC enhancement layer 410 which may comprise a first high-resolution view 411a and a second high-resolution view 411b of the 3D video. The high-resolution may comprise a resolution that may be greater than half resolution. The first high-resolution view 411a and the second high-resolution view 411b may be packed in a second single frame 411. The first single frame 401 in the SVC base layer 400 may be a base-layer reference 401c for the second single frame 411 in the SVC enhancement layer 410 for inter-layer prediction of spatial scalable coding. The exemplary steps may proceed to the end step 505.

In various embodiments of the invention, an encoder 204 in a 3D video transmitter 200 may be operable to encode a 3D video to generate a SVC base layer 400 and a SVC enhancement layer 410. A first view and a second view of the 3D video in the SVC enhancement layer 410 may be packed in a same frame. The SVC base layer 400 may comprise a first half-resolution view 401a and a second half-resolution view 401b of the 3D video. The first half-resolution view 401a and the second half-resolution view 401b may be packed in a first single frame 401. The first view in the SVC enhancement layer 410 may comprise a first high-resolution view 411a and the second view in the SVC enhancement layer 410 may comprise a second high-resolution view 411b. The high-resolution may comprise a resolution that may be greater than half resolution. The first high-resolution view 411a and the second high-resolution view 411b may be packed in a second single frame 411. The first single frame 401 in the SVC base layer 400 may be a base-layer reference 401c for the second single frame 411 in the SVC enhancement layer 410 for inter-layer prediction of spatial scalable coding.

In an exemplary embodiment of the invention, a total number of bits for the first half-resolution view 401a may be different from a total number of bits for the second half-resolution view 401b. A total number of bits for the first high-resolution view 411a may be different from a total number of bits for the second high-resolution view 411b.

When operating in film mode, the encoder 204 may be operable to encode the 3D video, using pulldown, to generate the SVC base layer 400. The SVC base layer 400 may comprise the first half-resolution view 401a and the second half-resolution view 401b, in an interlaced format at a higher frame rate that is higher than original frame rate of the 3D video. The 3D video may be encoded to generate the SVC enhancement layer 410, which may comprise the first high-resolution view 411a and the second high-resolution view 411b, in a progressive format at the original frame rate. In this instance, for example, the transmitted SVC base layer 400, which may comprise the first half-resolution view 401a and the second half-resolution view 401b, may be decoded, by the decoder 304 in the 3D video receiver 300, to generate a decompressed 3D video with the half-resolution in the interlaced format at the higher frame rate. The transmitted SVC enhancement layer 410, which may comprise the first high-resolution view 411a and the second high-resolution view 411b, may be decoded, by the decoder 304 in the 3D video receiver 300, to generate a decompressed 3D video with the high-resolution in the progressive format at the original frame rate.

In an exemplary embodiment of the invention, the 3D video transmitter 110 may be operable to transmit the SVC base layer 400 and the SVC enhancement layer 410 in a single elementary stream in a transport stream 120 to a 3D video receiver 130. Alternatively, the SVC base layer 400 may be transmitted in a first elementary stream in a transport stream 120 and the SVC enhancement layer 410 may be transmitted in a second elementary stream in the transport stream 120 to a 3D video receiver 130. In another exemplary embodiment of the invention, the SVC base layer 400 may be transmitted in a first transport stream such as the transport stream 120 and SVC enhancement layer 410 may be transmitted in a second transport stream such as the transport stream 121 to a 3D video receiver 130.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for 3D video coding using SVC spatial scalability.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video, the method comprising:
in a 3-dimensional (3D) video transmitter:
encoding a 3D video to generate a scalable video coding (SVC) base layer that comprises a left first-resolution view and a right first-resolution view packed in a first frame; and
encoding said 3D video to generate a SVC enhancement layer that comprises a left second-resolution view and a right second-resolution view packed in a second frame, wherein the left second-resolution view and the right second-resolution view have a higher spatial resolution than the left first-resolution view and the right first-resolution view.

2. The method according to claim 1, wherein said first frame in said SVC base layer is a base-layer reference for said second frame in said SVC enhancement layer for inter-layer prediction of a spatial scalable coding.

3. The method according to claim 1, wherein a first total bit quantity for said left first-resolution view is different from a second total bit quantity for said right first-resolution view.

4. The method according to claim 1, wherein a first total bit quantity for said left second-resolution view is different from a second total bit quantity for said right second-resolution view.

5. The method according to claim 1, comprising, when operating in a film mode in the 3D video transmitter:
  encoding said 3D video to generate said SVC base layer in an interlaced format at a frame rate that is higher than an original frame rate of said 3D video, using pulldown; and
  encoding said 3D video to generate said SVC enhancement layer in a progressive format at said original frame rate.

6. The method according to claim 5, comprising transmitting said SVC base layer in said interlaced format at said higher frame rate and said SVC enhancement layer in said progressive format at said original frame rate to a 3D video receiver.

7. The method according to claim 1, comprising transmitting said SVC base layer and said SVC enhancement layer in a single elementary stream in a transport stream to a 3D video receiver.

8. The method according to claim 1, comprising transmitting said SVC base layer in a first elementary stream in a transport stream and said SVC enhancement layer in a second elementary stream in said transport stream to a 3D video receiver.

9. The method according to claim 1, comprising transmitting said SVC base layer in a first transport stream and said SVC enhancement layer in a second transport stream to a 3D video receiver.

10. A system for processing video, the system comprising:
  one or more processors, one or more circuits, or any combination thereof for use in a 3-dimensional (3D) video transmitter, said one or more processors, said one or more circuits, or any combination thereof being operable to:
  encode a 3D video to generate a scalable video coding (SVC) base layer that comprises a left first-resolution view and a right first-resolution view packed in a first frame; and
  encode said 3D video to generate a SVC enhancement layer that comprises a left second-resolution view and a right second-resolution view packed in a second frame, wherein the left second-resolution view and the right second-resolution view have a higher spatial resolution than the left first-resolution view and the right first-resolution view.

11. The system according to claim 10, wherein said first frame in said SVC base layer is a base-layer reference for said second frame in said SVC enhancement layer for inter-layer prediction of a spatial scalable coding.

12. The system according to claim 10, wherein a first total bit quantity for said left first-resolution view is different from a second total bit quantity for said right first-resolution view.

13. The system according to claim 10, wherein a first total bit quantity for said left second-resolution view is different from a second total bit quantity for said right second-resolution view.

14. The system according to claim 10, wherein, when operating in a film mode, said one or more processors, said one or more circuits, or any combination thereof are operable to:
  encode said 3D video to generate said SVC base layer in an interlaced format at a frame rate that is higher than an original frame rate of said 3D video, using pulldown; and
  encode said 3D video to generate said SVC enhancement layer in a progressive format at said original frame rate.

15. The system according to claim 14, wherein said one or more processors, said one or more circuits, or any combination thereof are operable to transmit said SVC base layer in said interlaced format at said higher frame rate and said SVC enhancement layer in said progressive format at said original frame rate to a 3D video receiver.

16. The system according to claim 10, wherein said one or more processors, said one or more circuits, or any combination thereof are operable to transmit said SVC base layer and said SVC enhancement layer in a single elementary stream in a transport stream to a 3D video receiver.

17. The system according to claim 10, wherein said one or more processors, said one or more circuits, or any combination thereof are operable to transmit said SVC base layer in a first elementary stream in a transport stream and said SVC enhancement layer in a second elementary stream in said transport stream to a 3D video receiver.

18. The system according to claim 10, wherein said one or more processors, said one or more circuits, or any combination thereof are operable to transmit said SVC base layer in a first transport stream and said SVC enhancement layer in a second transport stream to a 3D video receiver.

19. A method, comprising:
  obtaining, in a 3-dimensional (3D) video receiver, a compressed 3D video comprising a scalable video coding (SVC) base layer and a SVC enhancement layer, the SVC base layer comprising a left first-resolution view and a right first-resolution view packed in a first frame, the SVC enhancement layer comprising a left second-resolution view and a right second-resolution view packed in a second frame, wherein the wherein the left second-resolution view and the right second-resolution view have a higher spatial resolution than the left first-resolution view and the right first-resolution view; and
  decoding, in the 3D video receiver, the compressed 3D video using the SVC base layer to generate a decompressed 3D video.

20. The method of claim 19, comprising decoding, in the 3D video receiver, the compressed 3D video using the SVC enhancement layer to generate the decompressed 3D video.

* * * * *